(12) United States Patent
Woerner

(10) Patent No.: US 7,520,564 B2
(45) Date of Patent: Apr. 21, 2009

(54) HEADREST FOR A VEHICLE SEAT

(75) Inventor: Ulrich Woerner, Weil der Stadt (DE)

(73) Assignee: Daimler AG, Stuttgart (DE)

( * ) Notice: Subject to any disclaimer, the term of this patent is extended or adjusted under 35 U.S.C. 154(b) by 2 days.

(21) Appl. No.: 10/576,184

(22) PCT Filed: Oct. 5, 2004

(86) PCT No.: PCT/EP2004/011095

§ 371 (c)(1),
(2), (4) Date: Mar. 29, 2007

(87) PCT Pub. No.: WO2005/035304

PCT Pub. Date: Apr. 21, 2005

(65) Prior Publication Data

US 2007/0241593 A1  Oct. 18, 2007

(30) Foreign Application Priority Data

Oct. 18, 2003  (DE) ................. 103 48 939

(51) Int. Cl.
*B60N 2/427* (2006.01)
*B60N 2/48* (2006.01)

(52) U.S. Cl. ................. 297/216.12; 297/408
(58) Field of Classification Search ........... 297/216.12, 297/408

See application file for complete search history.

(56) References Cited

U.S. PATENT DOCUMENTS

| 6,082,817 | A  | * | 7/2000  | Muller ............... 297/216.12 X |
| 6,213,548 | B1 | * | 4/2001  | Van Wynsberghe et al. ............ 297/216.12 |
| 6,250,714 | B1 | * | 6/2001  | Nakano et al. ......... 297/216.12 |
| 6,688,697 | B2 | * | 2/2004  | Baumann et al. ........... 297/391 |
| 6,805,411 | B2 | * | 10/2004 | Gramss et al. ............. 297/408 |
| 6,824,212 | B2 | * | 11/2004 | Malsch et al. ......... 297/216.12 |

FOREIGN PATENT DOCUMENTS

| DE | 102 24 060 C1 | 7/2003 |
| DE | 102 02 598 A1 | 8/2003 |

OTHER PUBLICATIONS

Int'l Search Report.

* cited by examiner

*Primary Examiner*—Anthony D Barfield
(74) *Attorney, Agent, or Firm*—Crowell & Moring LLP

(57) ABSTRACT

A headrest for a vehicle seat includes a stationary support part, and an impact element which can be moved relative to the latter. The impact element is mounted on the support part via a lever system which can be at least partially decoupled, so that it permits different sequences of movement between impact element and the support part.

7 Claims, 2 Drawing Sheets

HEADREST FOR A VEHICLE SEAT

BACKGROUND AND SUMMARY OF THE INVENTION

This application is a National Phase of PCT/EP2004/011095, filed Oct. 5, 2004, and claims the priority of German patent document DE 103 48 939.8, filed Oct. 18, 2003, the disclosure of which is expressly incorporated by reference herein.

The present invention relates to a headrest for a vehicle seat, with a stationary support part and an impact element which can be moved relative to the latter.

A known headrest of the generic type disclosed in German patent document DE 102 02 598 A1 has a stationary support part and an impact element which can be moved relative to the latter. The two are connected to each other via upper and lower levers which form four-bar linkages. The impact element can be moved relative to the stationary support part by pivoting the levers so as to actuate the four-bar linkage. Such pivoting of the impact element relative to the stationary support part occurs in two different situations. First, by pulling the impact element forward, a desired comfortable distance can be set between head and headrest. A locking device locks the four-bar linkages, and keeps the impact element in position once it is set. Second, such moving can also be induced by a crash, via the four-bar linkage as described previously. While the adjustment for comfort purposes is carried out manually, the crash-active adjustment is performed by a drive unit.

One object of the present invention is provides an improved headrest for a vehicle seat with a stationary support part and an impact element that can be moved relative to the latter.

Another object of the invention is to provide such a headrest which is simple and can be manufactured cost effectively.

These and other objects and advantages are achieved by the headrest configuration according to the invention, in which a lever system provided between the impact element and support part can be at least partially decoupled, so that different sequences of movement are possible between the support part and impact element, depending on the reason for which such a movement takes place. Such independence of movement makes it possible to set each sequence of movement separately, and thus to provide an ideal sequence of movement for each triggering situation. In addition, the provision of two different locking systems is unnecessary.

According to one embodiment of the invention, the impact element is mounted on the support part via at least one lower lever and one upper lever. The connection via two levers constitutes a simple lever system which can be made sufficiently robust to absorb forces acting on the impact element during an accident.

It is also possible to provide a pair of levers at the bottom and top, which makes the mounting of the movable impact element more stable. The use of pairs of levers therefore supports a robust and reliable mounting of the impact element on the stationary support component. The upper and lower levers can be mounted pivotably in each case both on the stationary support part and on the movable impact element, so that they form a four-bar linkage in each case.

In still another embodiment, a hinge point of the four-bar linkage is mounted displaceably, so that the four-bar linkage can be decoupled, so as to permit different sequences of movement via the same lever arrangement. If the displaceably mounted hinge point of the four-bar linkage is locked, the sequence of movement is characterized by a pivoting of the levers about the four-bar linkages, so that the movement of the impact element relative to the stationary support part is distinguished by a combination of a pivoting movement with a translation movement. Depending in each case on the arrangement of the levers, the impact element can thereby be displaced forward (i.e., toward the vehicle occupant's head), and also downward or upward. When the displaceably mounted hinge point of the four-bar linkage is unlocked, a different sequence of movement becomes possible, which is distinguished by pivoting of at least one lever with the impact plate about a hinge point. This type of movement makes it possible to set both the distance of the impact element from a vehicle occupant's head and the inclination of the impact element.

The displaceably mounted hinge point can be a bolt which is mounted in an elongated hole, and can be pressed into the elongated hole, so as to lock the hinge point in the mounting. As a result, the elongated hole achieves a defined frictional value against the bolt. In order to adjust the hinge point in the elongated hole, a minimum force must first be overcome. This arrangement has the advantage that it can be produced in a simple and material-saving manner. It constitutes a simple possibility of locking a hinge point in a mounting.

The different sequences for moving the impact element in different situations include, for example, transfer of the impact element from a normal position into a protective position in the event of an accident, in order to protect the vehicle occupant against injuries. The protective position is defined in such a manner that it prevents a vehicle occupant's head from swinging back in the event of an accident, and therefore prevents injuries.

The transfer from the normal position into the protective position can take place via the four-bar linkage. Pivoting via the four-bar linkage has the advantage that a reliable and specifically predeterminable displacement of the impact element relative to the stationary support part is possible.

According to a further embodiment, the impact element can be adjusted in its normal position for comfort reasons. In this case, the adjustment can take place by via the decoupled four-bar linkage. For example, the comfort adjustment can take place via a movement of the displaceably mounted hinge point of the four-bar linkage.

Other objects, advantages and novel features of the present invention will become apparent from the following detailed description of the invention when considered in conjunction with the accompanying drawings.

DETAILED DESCRIPTION OF THE DRAWINGS

Figure 1:
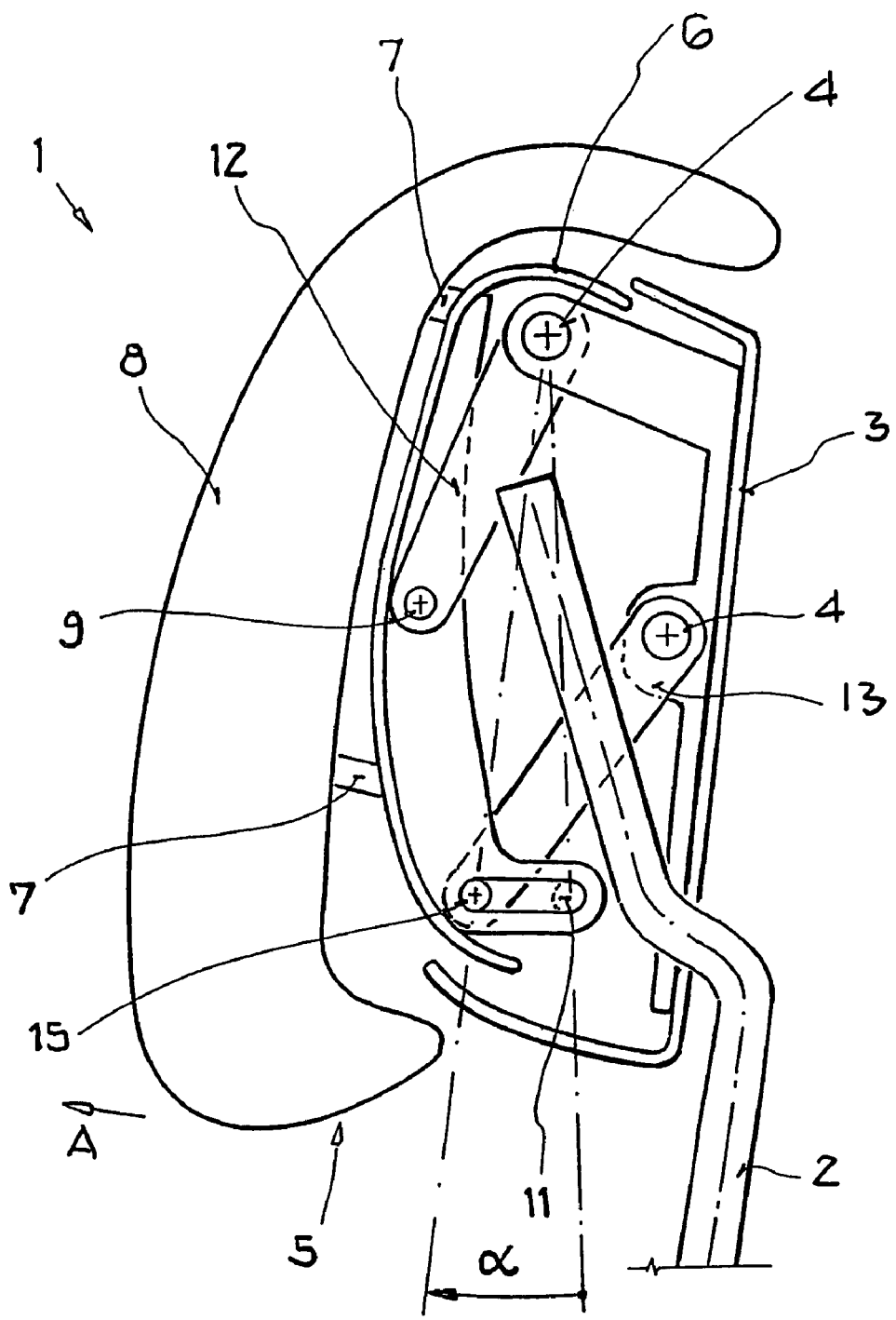
FIG. 1 is a diagrammatic sectional illustration of a headrest according to the invention in a normal position.
Figure 2:
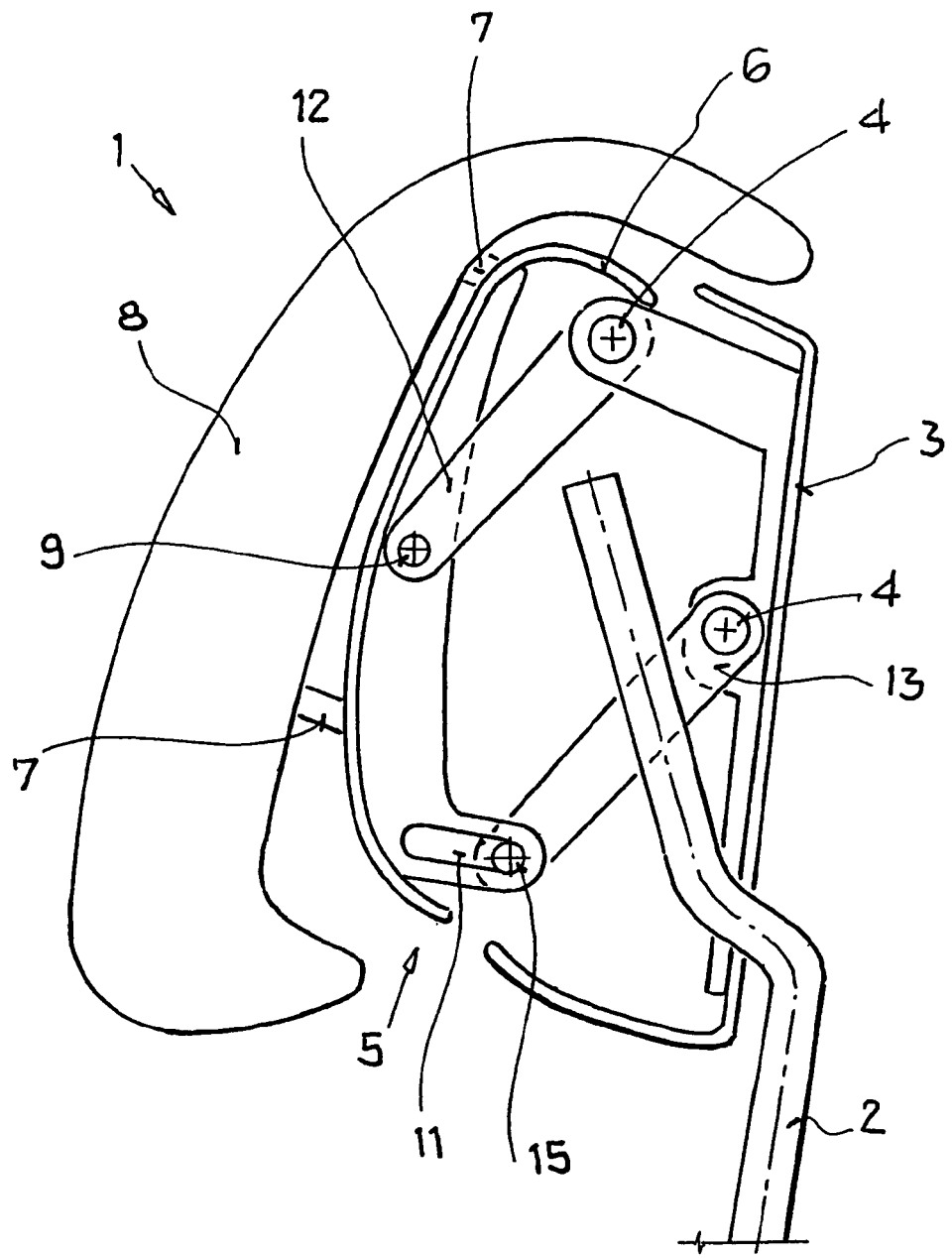
FIG. 2 is a diagrammatic sectional illustration according to FIG. 1 in a normal position which has been adjusted for comfort purposes.

Referring to FIG. 1, a headrest 1 is fastened to a seat (not illustrated) via headrest rods 2. It includes a support part 3, which is connected to the headrest rods 2. An impact element 5 comprises a supporting body 6 and a cushion 8 which is connected to the supporting body 6 via connecting webs 7. Bearings 9, 11 for hinge points are likewise provided on the supporting body 6. The impact element 5 is connected to the support part 3 via upper and lower levers 12, 13. The lever 12 extends from the upper bearing 4 on the support part 3 as far as the upper bearing 9 on the impact element 5. The lever 13 extends from the lower bearing 4 on the support part 3 as far as the lower bearing 11 on the impact element 5. The bearings accommodate rotary joints which may be composed of bolts, for example.

Only one upper lever 12 and one lower lever 13 are illustrated in the figures. However, it is also possible to provide respective pair of levers at the top and bottom. Only the levers 12 and 13 which are illustrated are described below.

The lower bearing 11 on the impact element 5 is provided in the form of an elongated hole. A bolt 15, which forms the lower joint of the lower lever 13 is mounted in the elongated hole, so that it is possible to displace the bolt 15 in the bearing 11, i.e., relative to the impact element 5. The remaining hinge points in the bearings 4 and 9 are designed as a fixed position; that is, bolts forming the hinge points are not mounted displaceably.

The operation of the headrest according to the invention will be described in more detail below:

By decoupling of the lever system 12, 13 connecting the stationary support part 3 and the movable impact element 5, the movable impact element 5 can carry out different sequences of movement. One sequence of movement is carried out if a vehicle occupant adjusts the headrest for comfort reasons. Another is carried out if the headrest 1 is transferred from its normal position into a protective position in the event of an accident.

If a vehicle occupant wishes to adjust the impact element 5 for comfort reasons, he or she can do so by applying a force in the direction of the arrow A in FIG. 1. This force causes the impact element 5 to rotate by the upper lever 12 about the upper hinge point 4 on the stationary support part 3. The maximum adjustment distance of a rotational movement of this type is predetermined by the length of the elongated hole 11. In the exemplary embodiment illustrated, the maximum angle of adjustment corresponds to the angle α shown.

The comfort adjustment thus provides an inclination of the impact elements, which proceeds from a pivoting about the pivot point 4 of the upper lever 12. For this purpose, the elongated hole 11 is of curved design and has a radius corresponding to the distance from the upper pivot point 4. The bolt 15 is preferably pressed into the elongated hole 11, so that a defined frictional force is exerted which opposes a movement of the bolt 15 in the elongated hole 11. Such frictional value enables the impact element 5 to be locked in any position, and therefore enables an infinitely variable setting of the impact element 5. Of course, any other form of locking the impact element 5 relative to the lower lever 13 is also conceivable. The elongated hole 11 may also be of profiled design, or its walls may be of contoured design, so that a stepwise or latched adjustment is possible. The adjustment for comfort purposes may also take place with the aid of a drive, for example an electric motor.

In the event of a crash, the impact element 5 is displaced in a manner that is known from the prior art, by simultaneous pivoting of the levers 12, 13 about the hinge points 4. In this case, the impact element 5 pivots forward or upward, independently of an inclination which has been set for the impact element 5. A conventional locking is also provided for this use situation. The drive used may be, for example, a prestressed spring.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A headrest for a vehicle seat, comprising:
   a stationary support part; and
   an impact element which can be moved relative to the stationary support part;
   an upper lever having first and second ends;
   a lower lever having first and second ends;
   a rotary joint interconnecting the first end of the upper lever to the impact element;
   a rotary joint interconnecting the second end of the upper lever to the stationary support part;
   a rotary joint interconnecting the second end of the lower lever to the stationary support part; and
   a bolt, located at the first end of the lower lever, that is displaceable in an elongated hole in the impact element to permit predetermined limited rotation of the impact element about the rotary joint interconnecting the first end of the upper lever to the stationary support part;
   wherein the upper and lower levers can be at least partially decoupled to permit different sequences of movement between the impact element and the support part during headrest movement for comfort and during headrest movement in the event of an accident.

2. The headrest as claimed in claim 1, wherein the impact element is mounted on the support part via at least one lower pair of levers and at least one upper pair of levers.

3. The headrest as claimed in claim 2, wherein each pair of upper and lower levers forms a four-bar linkage.

4. The headrest as claimed as claim 1, wherein the bolt is pressed into the elongated hole.

5. The headrest as claimed in claim 1, wherein the impact element can be transferred from a normal position into a protective position.

6. The headrest as claimed in claim 5, wherein the transfer from the normal position into the protective position takes place via the four-bar linkage.

7. The headrest as claimed in claim 1, wherein a comfort adjustment takes place by displacement of the bolt within the elongated hole.

* * * * *